(12) United States Patent
Maier et al.

(10) Patent No.: US 8,459,007 B2
(45) Date of Patent: Jun. 11, 2013

(54) CONTROL SYSTEM FOR COLD START EMISSIONS REDUCTION IN HYBRID VEHICLES

(75) Inventors: Colleen Marie Maier, Milwaukee, WI (US); David N. Belton, Birmingham, MI (US)

(73) Assignee: GM Global Technology Operations LLC

( * ) Notice: Subject to any disclaimer, the term of this patent is extended or adjusted under 35 U.S.C. 154(b) by 1522 days.

(21) Appl. No.: 12/028,989

(22) Filed: Feb. 11, 2008

(65) Prior Publication Data

US 2009/0199560 A1 Aug. 13, 2009

(51) Int. Cl.
*F01N 3/00* (2006.01)
*F01N 3/10* (2006.01)

(52) U.S. Cl.
USPC .......... 60/285; 60/284; 60/299; 60/300

(58) Field of Classification Search
USPC .... 60/274, 284, 285, 299, 300, 302; 123/434, 123/436, 679, 68; 701/22, 86, 113
See application file for complete search history.

(56) References Cited

U.S. PATENT DOCUMENTS

| | | | | |
|---|---|---|---|---|
| 5,711,272 | A | * | 1/1998 | Maegawa et al. ........ 123/406.53 |
| 2002/0177939 | A1 | * | 11/2002 | Kabasin ..................... 701/110 |
| 2004/0128981 | A1 | | 7/2004 | Moore et al. |
| 2004/0177833 | A1 | * | 9/2004 | Murase et al. ........... 123/406.45 |
| 2005/0034451 | A1 | * | 2/2005 | Miyashita ..................... 60/300 |
| 2006/0156710 | A1 | * | 7/2006 | Pott ............................. 60/285 |
| 2006/0218903 | A1 | * | 10/2006 | Ogata ........................... 60/295 |
| 2007/0074702 | A1 | * | 4/2007 | Nakamura et al. ........... 123/299 |
| 2007/0113822 | A1 | * | 5/2007 | Kim et al. .................... 123/300 |
| 2007/0219702 | A1 | * | 9/2007 | Kishimoto ................... 701/103 |
| 2007/0246272 | A1 | * | 10/2007 | Ogata .......................... 180/65.2 |
| 2008/0028842 | A1 | * | 2/2008 | Asano et al. .................. 73/116 |

* cited by examiner

*Primary Examiner* — Kenneth Bomberg
*Assistant Examiner* — Audrey K Bradley

(57) ABSTRACT

A method comprises modifying combustion parameters of an engine of a hybrid vehicle to provide an engine power level insufficient to maintain crankshaft rotation at a desired speed including increasing a temperature of an exhaust gas and reducing an emissions content of the exhaust gas; and supplementing the engine power level with an electric machine of the hybrid vehicle to maintain crankshaft rotation at the desired speed. A control module comprises a cold start combustion control module that modifies combustion parameters of an engine of a hybrid vehicle to provide an engine power level insufficient to maintain crankshaft rotation at a desired speed, wherein the modifying includes increasing a temperature of an exhaust gas, and reducing an emissions content of the exhaust gas; and an electric machine control module that supplements the engine power level using an electric machine of the hybrid vehicle to maintain crankshaft rotation at the desired speed.

17 Claims, 3 Drawing Sheets

CONTROL SYSTEM FOR COLD START EMISSIONS REDUCTION IN HYBRID VEHICLES

FIELD

The present disclosure relates to hybrid vehicles, and more specifically, to cold start emissions in hybrid vehicles.

BACKGROUND

The statements in this section merely provide background information related to the present disclosure and may not constitute prior art.

Hybrid vehicles may utilize an electric machine and an internal combustion engine to selectively produce torque that is transferred to a drivetrain to operate a vehicle. Energy may also be transferred between the internal combustion engine and electric machine. In its normal operation the internal combustion engine of a hybrid vehicle may produce gas emissions. Catalytic converters may reduce exhaust gas emissions in vehicles using an internal combustion engine.

A catalytic converter may be three-way catalytic converter and may include a substrate with a coating of catalyst materials that stimulate the oxidation of hydrocarbons and carbon monoxide, and the reduction of nitrogen oxides, in the exhaust gas. The catalysts may operate optimally when the temperature of the catalysts is above a minimum level. Emissions control using a catalytic converter may be difficult at cold vehicle startup because the catalysts have not reached the minimum operating temperature. Cold start emissions may also be affected by engine-out emissions.

Catalytic converter warm-up time may be reduced at an engine cold start by generating high engine-out energy. The energy may be dependent on exhaust temperature and mass flow rate. Retarding ignition timing and increasing engine idle speed may reduce cold start emissions by increasing these parameters. However, the impact of these strategies may be limited since retarding ignition timing lowers engine efficiency and may eventually result in engine stalling.

SUMMARY

A method comprises modifying combustion parameters of an engine of a hybrid vehicle to provide an engine power level insufficient to maintain crankshaft rotation at a desired speed including increasing a temperature of an exhaust gas and reducing an emissions content of the exhaust gas; and supplementing the engine power level with an electric machine of the hybrid vehicle to maintain crankshaft rotation at the desired speed.

A control module comprises a cold start combustion control module that modifies combustion parameters of an engine of a hybrid vehicle to provide an engine power level insufficient to maintain crankshaft rotation at a desired speed, wherein the modifying includes increasing a temperature of an exhaust gas, and reducing an emissions content of the exhaust gas; and an electric machine control module that supplements the engine power level using an electric machine of the hybrid vehicle to maintain crankshaft rotation at the desired speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present teachings will become more fully understood from the detailed description and the accompanying drawings, wherein.

DETAILED DESCRIPTION

Figure 1:
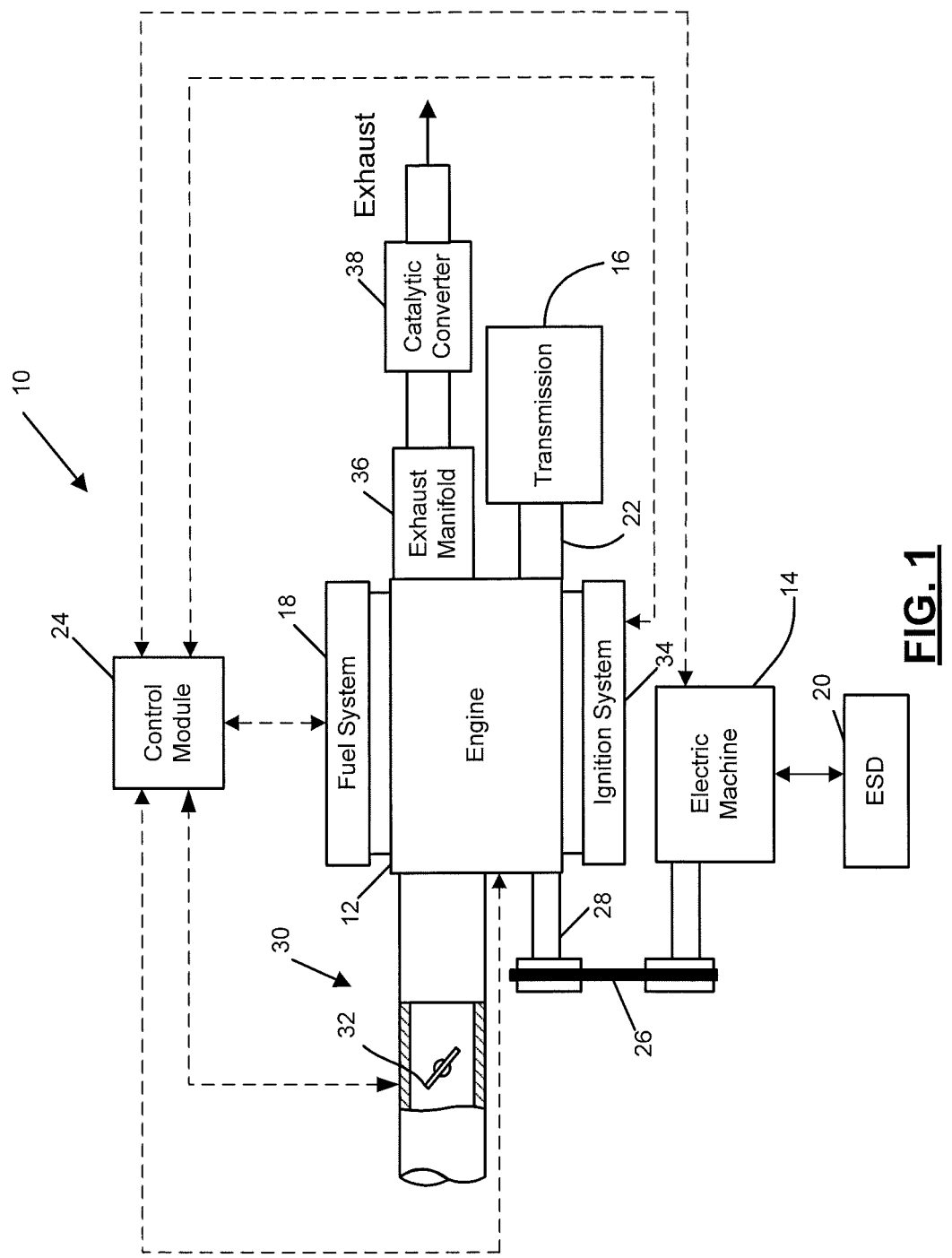
FIG. 1 is a schematic illustration of an exemplary hybrid vehicle.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, and/or a processor (shared, dedicated, or group) and memory that execute one or more software or firmware program.

Referring now to FIG. 1, an exemplary hybrid vehicle 10 is schematically illustrated. Hybrid vehicle 10 may include engine 12, electric machine 14, transmission 16, fuel system 18, energy storage device (ESD) 20, coupling 22, control module 24, belt-alternator system (BAS) 26, crankshaft 28, intake system 30, throttle 32, ignition system 34, exhaust manifold 36, and catalytic converter 38.

Engine 12 may be an internal combustion engine and may be in communication with intake system 30, exhaust manifold 36, fuel system 18, ignition system 34, BAS 26, and coupling 22. A crankshaft 28 of engine 12 may be engaged with electric machine 14 through BAS 26. BAS 26 may include a belt and pulleys that transfer drive torque between crankshaft 28 and electric machine 14. Alternatively, BAS 26 may be replaced by a flywheel-alternator-starter (FAS) system (not shown), wherein electric machine 14 is operably disposed between engine 12 and transmission 16. It is anticipated that other systems may be implemented to couple engine 12 and electric machine 14 including, but not limited to, a chain or gear system that is implemented between electric machine 14 and crankshaft 28 of engine 12. Electric machine 14 may have an electrical connection with ESD 20 to provide electrical power to operate electric machine 14. ESD 20 may include a rechargeable battery.

Engine 12 and electric machine 14 may selectively drive transmission 16 through BAS 26, crankshaft 28 and coupling 22. In one mode of vehicle 10 operation, electric machine 14 and engine 12 may provide drive torque to drive transmission 16 through BAS 26, crankshaft 28 and coupling 22. In another mode of operation, engine 12 may drive electric machine 14 through crankshaft 28 and BAS 26 to generate power used to recharge ESD 20. In another mode of operation, electric machine 14 may use energy from ESD 20 to drive crankshaft 28 of engine 12 through BAS 26 to provide all or substantially all drive torque to transmission 16 through coupling 22.

Fuel system 18 may control a fuel flow into engine 12, throttle 32 may control an air flow into engine 12 from intake system 30, and ignition system 34 may ignite the air/fuel mixture in engine 12. Exhaust manifold 36 may receive exhaust gas from engine 12 and catalytic converter 38 may receive exhaust gas from exhaust manifold 36. Catalytic converter 38 may reduce exhaust gas emissions from engine 12.

Catalytic converter 38 may be a three-way catalytic converter including a substrate with a coating of catalyst materials that stimulate the oxidation of hydrocarbons and carbon monoxide, and the reduction of nitrogen oxides, in the exhaust gas. Catalytic converter 38 may begin to operate optimally when the temperature of catalytic converter 38 is at a minimum temperature. Catalytic converter 38 operating temperatures may vary based on the catalysts, construction, or other materials used in the particular catalytic converter 38.

Control module 24 may be in communication with electric machine 14, throttle 32 of intake system 30, fuel system 18, ignition system 34 and engine 12, as well as other components of hybrid vehicle 10. Control module 24 may monitor and control components of hybrid vehicle 10.

Figure 2:
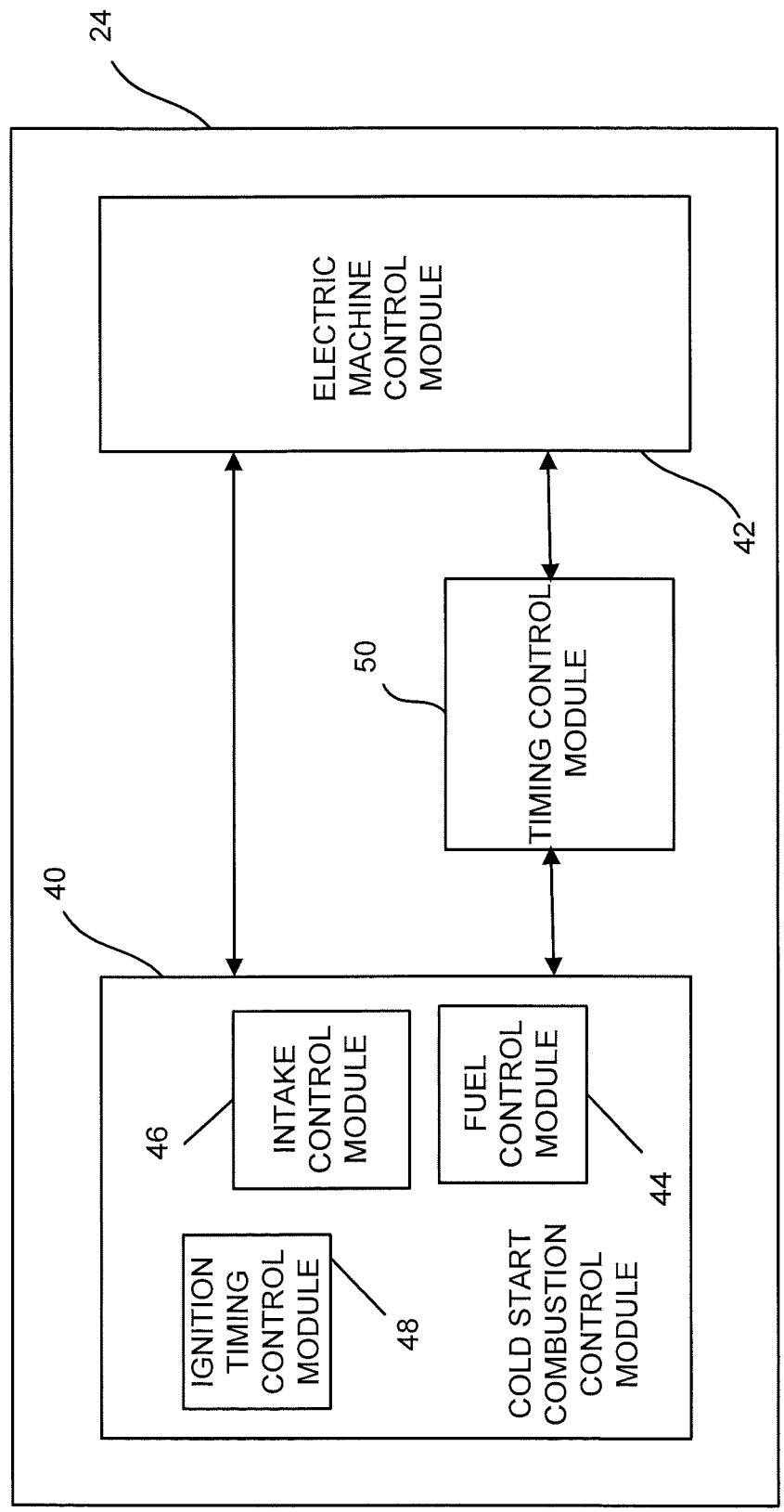
FIG. 2 is a block diagram of a control module for a hybrid vehicle.

Referring now to FIG. 2, control module 24 may include cold start combustion control module 40, electric machine control module 42 and timing control module 50. Cold start combustion control module 40 may include fuel control module 44, intake control module 46 and ignition timing control module 48.

Timing control module 50 may be in communication with cold start combustion control module 40, electric machine control module 42, and components and systems of vehicle 10. Timing control module 50 may compare conditions such as ignition status, timing measurements related to engine operation, and temperatures that correspond to a catalytic converter 38 temperature to predetermined thresholds to determine whether vehicle 10 should be operated pursuant to a cold start strategy, as will be described in more detail with respect to control logic 100 below. Timing control module 50 may communicate a cold start status to cold start combustion control module 40 and electric machine control module 42.

Cold start combustion control module 40, fuel control module 44, intake control module 46 and ignition timing control module 48 may be in communication with and control engine 12, fuel system 18, throttle 32 of intake system 30, and ignition system 34. Engine 12, throttle 32 of intake system 30, fuel system 18, and ignition system 34 may be controlled to operate under normal conditions such that engine 12 may receive air and fuel from intake system 30 and fuel system 18, and ignition system 34 may provide a spark such that the fuel and air are ignited within engine 12 to provide combustion power to maintain rotation of crankshaft 28 of engine 12 at a desired speed.

Indicated mean effective pressure (IMEP) is a measurement of the useful pressure produced by combustion and may be measured in units of kilopascals (kPa). In such normal operating conditions the IMEP of engine 12 may be in excess of 300 kPa. As will be described below with respect to the operation of control logic 100, cold start combustion control module 40, fuel control module 44, intake control module 46 and ignition timing control module 48 may not operate under normal conditions when a cold start strategy is indicated by timing control module 50.

Electric machine control module 42 may be in communication with cold start combustion control module 40, timing control module 50 and electric machine 14. Electric machine control module 42 may control electric machine 14 to selectively provide power to transmission 16 through BAS 26, crankshaft 28 of engine 12, and coupling 22.

Figure 3:
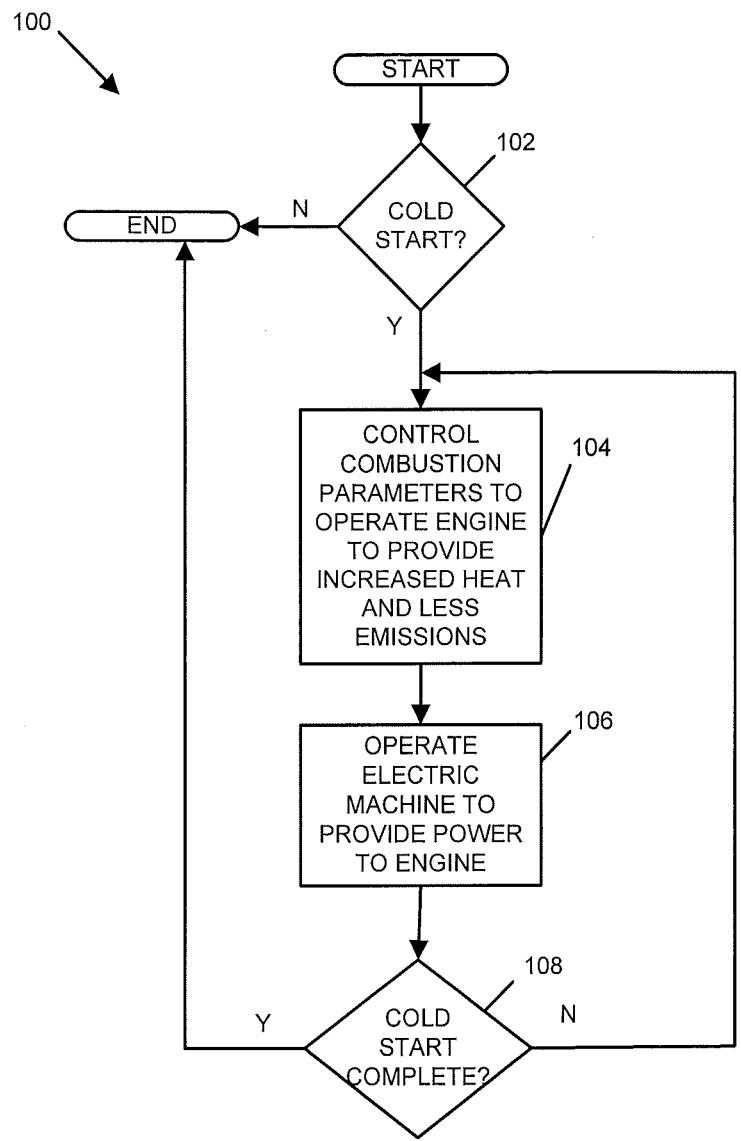
FIG. 3 is a flow diagram describing the steps in cold start emissions control for a hybrid vehicle.

Referring now to FIG. 3, a flow chart illustrates control logic 100 providing a method of cold start emissions reduction in hybrid vehicle 10. Block 102 may determine whether the cold start strategy is to be executed. Timing control module 42 may consider whether the vehicle is being started or may invoke more complex control strategies involving timing or measured parameters. Timing parameters may include parameters such as the elapsed time since the engine 12 was last operated while measured parameters may include a measured temperature corresponding to a temperature of catalytic converter 38. If timing control module 42 determines that the cold start strategy is to be executed, control logic 100 may continue to block 104. If the cold start strategy is not to be executed, control logic 100 is complete.

At block 104 engine 12, fuel system 18, intake system 30 and ignition system 34 may be operated by cold start combustion control module 40, fuel control module 44, intake control module 46 and ignition timing control module 48 to execute the cold start emissions strategy by operating the engine to provide exhaust with an increased temperature and reduced emissions content to catalytic converter 38. Engine 12 may receive air and fuel from intake system 30 and fuel system 18, and ignition system 34 may provide a spark such that the fuel and air are ignited within exhaust manifold 36 or within engine 12 during the exhaust stroke of engine 12.

The timing of these events may be such that most of the combustion energy is converted to heat in the exhaust gas rather than work to provide power to maintain rotation of crankshaft 28. When engine 12 is operated in this manner, the work provided by engine 12 may not be adequate to maintain rotation of crankshaft 28 and engine 12 may not continue to operate at a desired speed and may stall without the aid of electric machine 14, as will be described below. In a typical engine 12 during normal operation, an IMEP of 140 kPa or less may cause engine 12 to shake and eventually misfire and stall. At a typical cold start, the minimum IMEP at which the engine may misfire and stall may be 200 kPa. Even an engine 12 that is specifically designed to operate at a low IMEP may stall at 80 kPa or less.

When operated with electric machine 14 as described below the IMEP of engine 12 may be 30 kPa or less. The resulting exhaust that may be received by catalytic converter 38 may have a decreased emissions content and increased temperature compared to normal operation. In an exemplary hybrid vehicle 10 the exhaust gas temperature from engine 12 may exceed normal exhaust gas temperatures by approximately 50%. For example, at five seconds after a cold start the exhaust gas temperature may be approximately 400 degrees (C.) compared to approximately 250 degrees (C.) under normal operating conditions. Hydrocarbon content of exhaust gas from engine 12 may be approximately 25% of normal exhaust hydrocarbon emissions. For example, the concentration of hydrocarbons in the exhaust gas from engine 12 may be less than 200 parts per million compared to approximately 800 parts per million under normal operating conditions. Control logic 100 may then proceed to block 106.

Block 106 may operate electric machine 14 to provide supplementary drive power to engine 12. While the cold start strategy is being executed at block 104 engine 12 may not produce enough useful power to continue rotation of crankshaft 28 at a desired speed as described above. Without supplemental power, engine 12 may stall and may not be able to assist with rotation of crankshaft 28 or propulsion of hybrid vehicle 10. Electric machine control module 42 may control electric machine 14 to operate in combination with engine 12 to prevent a stall. As engine 12 output power is reduced to provide a heated exhaust with low emissions content, power may be provided by electric machine 14 through BAS 26 to maintain rotation of crankshaft 28 of engine 12 to prevent engine 12 from stalling. Control logic 100 may then proceed to block 108.

Block 108 may determine whether the cold start strategy is complete. The determination may include timing control module 50 communicating with electric machine control module 42 and cold start combustion control module 40 to cease cold start operation and return to normal operation of electric machine 14 and engine 12 based on parameters such as timing parameters and measured parameters.

Timing parameters may include a predetermined cold start run time. A predetermined cold start run time may be a time necessary to heat the catalytic converter 38 of the particular hybrid vehicle 10. Measured parameters may include measurements corresponding to emissions content of the exhaust gas or the temperature of catalytic converter 38. If the cold start run time has elapsed, the emissions content is less than a predetermined maximum, or if the temperature of catalytic converter 38 exceeds a predetermined minimum, timing control module 50 may communicate to cold start combustion control module 40 and electric machine control module 42 that the cold start strategy is complete and control logic 100 may end. If the cold start strategy is not complete, control logic 100 may return to block 104.

Those skilled in the art may now appreciate from the foregoing description that the broad teachings of the present disclosure may be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A control module comprising:
a first electronic circuit configured to modify combustion parameters of an engine of a hybrid vehicle to delay combustion by adjusting at least one of air, fuel and ignition timing to the engine such that combustion occurs during an exhaust stroke of the engine or in an exhaust manifold, the modified combustion parameters providing an engine power level insufficient to maintain crankshaft rotation at a desired speed and insufficient to prevent the engine from stalling, wherein the modifying includes:
increasing a temperature of an exhaust gas; and
reducing an emissions content of the exhaust gas; and
a second electronic circuit configured to supplement the engine power level using an electric machine of the hybrid vehicle to maintain crankshaft rotation at the desired speed.

2. The control module of claim 1, wherein the engine burns fuel during the exhaust stroke of the engine.

3. The control module of claim 1, wherein the engine burns fuel in the exhaust manifold of the engine.

4. The control module of claim 1, further comprising a third electronic circuit configured to continue operation of the first and second electronic circuits for a predetermined time to heat a catalytic converter to at least a desired temperature.

5. The control module of claim 1, further comprising a third electronic circuit configured to continue operation of the first and second electronic circuits until a measured catalytic converter temperature exceeds a predetermined temperature.

6. The control module of claim 1 wherein the first and second electronic circuits include at least one of an Application Specific Integrated Circuit (ASIC), a processor and memory including one or more programs, and a combinational logic circuit.

7. The control module of claim 1, wherein the first electronic circuit is configured to operate the engine at an indicated mean effective pressure (IMEP) of less than 200 kPa.

8. The control module of claim 7, wherein the first electronic circuit is configured to operate the engine at an IMEP of less than 80 kPa.

9. The control module of claim 8, wherein the first electronic circuit is configured to operate the engine at an IMEP of less than 30 kPa.

10. A method, comprising:
modifying combustion parameters of an engine of a hybrid vehicle to delay combustion including adjusting at least one of air, fuel and ignition timing to the engine such that combustion occurs during an exhaust stroke of the engine or in an exhaust manifold, the modified combustion parameters providing an engine power level insufficient to maintain crankshaft rotation at a desired speed and insufficient to prevent the engine from stalling including:
increasing a temperature of an exhaust gas; and
reducing an emissions content of the exhaust gas; and
supplementing the engine power level with an electric machine of the hybrid vehicle to maintain crankshaft rotation at the desired speed.

11. The method of claim 10, wherein the modifying combustion parameters includes adjusting at least one of air, fuel and ignition timing to the engine such that combustion occurs during the exhaust stroke of the engine.

12. The method of claim 10, wherein the modifying combustion parameters includes adjusting at least one of air, fuel and ignition timing to the engine such that combustion occurs in the exhaust manifold.

13. The method of claim 10, further comprising continuing the modifying combustion parameters and the supplementing the power level for a predetermined time to heat a catalytic converter to at least a desired temperature.

14. The method of claim 10, further comprising continuing the modifying combustion parameters and the supplementing the power level until a temperature of a catalytic converter exceeds a predetermined temperature.

15. The method of claim 10, wherein the engine operates at an indicated mean effective pressure (IMEP) of less than 200 kPa.

16. The method of claim 15, wherein the engine operates at an IMEP of less than 80 kPa.

17. The method of claim 16, wherein the engine operates at an IMEP of less than 30 kPa.

* * * * *